United States Patent [19]

Calmettes et al.

[11] Patent Number: 4,890,360
[45] Date of Patent: Jan. 2, 1990

[54] BAND CLAMP WITH TIGHTENING ELEMENTS FORMED SEPARATELY

[75] Inventors: Lionel Calmettes; Michel André, both of Romorantin Lanthenay, France

[73] Assignee: Establissements Caillau, Issy-les-Moulineaux, France

[21] Appl. No.: 205,817

[22] Filed: Jun. 13, 1988

[30] Foreign Application Priority Data

Jun. 23, 1987 [FR] France .............................. 87 08831

[51] Int. Cl.⁴ .............................................. B65D 63/02
[52] U.S. Cl. ................................ 24/20 R; 24/20 CW; 24/20 EE
[58] Field of Search ............ 24/20 R, 20 EE, 20 CW, 24/20 W, 23 W, 23 EE, 279, 484, 20 TT

[56] References Cited

U.S. PATENT DOCUMENTS

| 792,376 | 6/1905 | Yamamoto | 24/20 R |
|---|---|---|---|
| 916,673 | 3/1909 | Clawson | 24/20 R |
| 1,472,966 | 11/1923 | Englund | 24/20 TT |
| 1,631,396 | 6/1927 | Beegle | 24/20 CW |
| 3,139,261 | 6/1964 | Tinnerman | 24/20 EE |
| 3,429,605 | 2/1969 | Soesbergen | 24/20 TT |
| 3,737,959 | 6/1973 | Smith et al. | 24/279 |
| 4,275,484 | 6/1981 | Irio et al. | 24/23 EE |
| 4,517,708 | 5/1985 | Calmettes et al. | 24/20 CW |
| 4,713,863 | 12/1987 | Jennings | 24/20 R |
| 4,742,600 | 5/1988 | Calmettes et al. | 24/20 R |

FOREIGN PATENT DOCUMENTS

| 003192 | 7/1979 | European Pat. Off. |  |
| 153483 | 9/1985 | European Pat. Off. |  |
| 2596468 | 7/1988 | France |  |
| 365588 | 12/1962 | Switzerland | 24/20 TT |
| 442902 | 1/1968 | Switzerland |  |

Primary Examiner—Victor N. Sakran
Attorney, Agent, or Firm—Lewis H. Eslinger; Jay H. Maioli

[57] ABSTRACT

This invention relates to a clamp, adapted to be dismounted and re-used, constituted by a metal band wound on itself, comprising respectively in the vicinity of each of its ends, on the one hand, two radial stops directed outwardly of the band to constitute complementary tightening means adapted to be gripped by a tool of the pliers type, on the other hand, complementary joining means generally in the form of hooks which, in the non-tightened state of the clamp, are at a distance from each other. Each assembly of a tightening means and of a joining means is constituted by a portion of metal band of which the two ends are suitably bent to form the stop and the hook, said band portion being independent of the band constituting the clamp and being fixed thereon by any appropriate means.

8 Claims, 2 Drawing Sheets

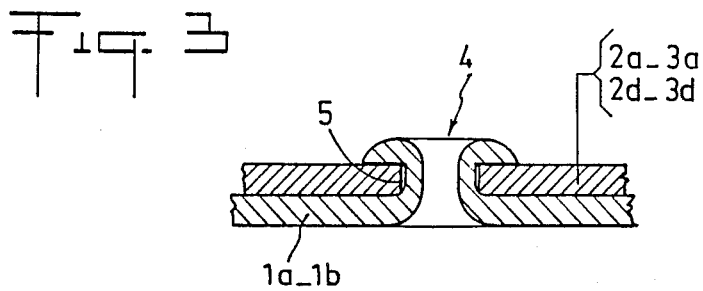
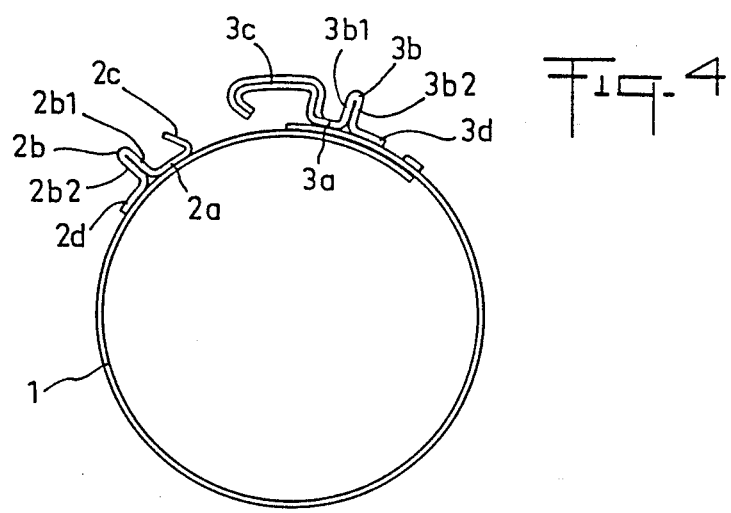
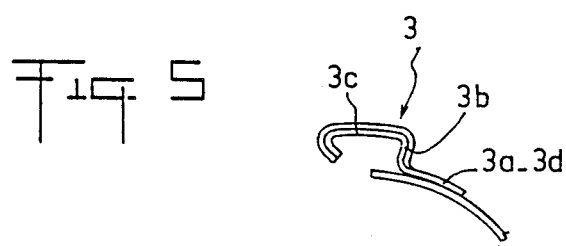

BAND CLAMP WITH TIGHTENING ELEMENTS FORMED SEPARATELY

FIELD OF THE INVENTION

The present invention relates to a clamp.

BACKGROUND OF THE INVENTION

Patent EU-A-0 003 192 already discloses a clamp which is easy to dismount and re-use, intended particularly, but not exclusively, for securing a sleeve or flexible hose on a rigid pipe.

Such a clamp is constituted by a metal band wound on itself, whose ends are suitably bent to form complementary tightening and joining means. The tightening means are constituted by lugs forming radial stops on which may abut the jaws of a tool of the pliers type. The joining means are themselves constituted by two complementary elements generally in the form of hooks. When the clamp is in non-tightened state, the two complementary joining means are separate from each other but cooperate with each other after the clamp has been tightened and thus maintain the clamp in its tightened position.

Such a clamp gives entire satisfaction in a large number of applications, but it has appeared necessary to improve the design thereof in order to take into account certain requirements both from the standpoint of the consumers and of manufacture.

In fact, this known clamp may be reproached with requiring special pliers for assembling it, whereas the consumers would like a clamp which can be positioned with the aid of ordinary flat pliers.

Furthermore, the joining means, necessarily projecting on the outer periphery of the clamp, risk, if they are mounted on mobile members, for example on rotating shafts, either being unhooked or gripping on objects. This is particularly the case when the clamps in question are used for securing bellows for protecting the universal joints of the transmission shafts of a vehicle. Consequently, it is desired that the joining means of the clamp be protected against any dangerous approach of objects.

Finally, concerning manufacture, it should be noted that the known clamp necessitates the combination of several techniques (rolling, folding, pressing), which requires somewhat complicated and expensive machines and tools. In addition, each clamp has specific dimensions and it is not possible, as has already been proposed for other types of clamps, particularly by Patent EU-A-0 153 452, to make the different parts of the clamp separately, which would rationalize manufacture and reduce the costs thereof.

It is an object of the present invention to overcome the difficulties which have just been set forth whilst conserving the advantages of the prior known clamp described in Patent EU-A-0 003 192.

SUMMARY OF THE INVENTION

According to the invention, each assembly of a tightening means and of a joining means disposed in the vicinity of one of the end of the wound band forming the clamp, is itself constituted by a portion of metal band whose ends are suitably bent to form the stop (tightening means) and the hook (joining means). Said portion of metal band is independent of the band constituting the clamp and is fixed thereon by any appropriate means, such as in particular by spot welding or rivetting.

BRIEF DESCRIPTION OF THE DRAWINGS

The invention will be more readily understood on reading the following description with reference to the accompanying drawings, in which:

FIG. 3 is a view in detail of a means for securing a tightening and joining assembly on one of the ends of the clamp.

FIG. 4 is a view, similar to FIG. 1, of an advantageous variant embodiment.

FIG. 5 is a partial view of a second variant embodiment of the clamp.

DETAILED DESCRIPTION OF THE DRAWINGS

Figure 1:
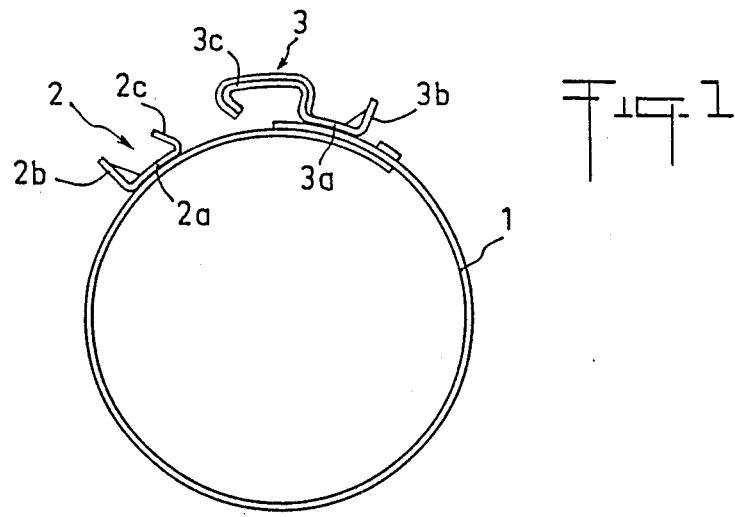
FIG. 1 is a view in elevation of a clamp according to the invention, in the non-tightened state.
Figure 2:
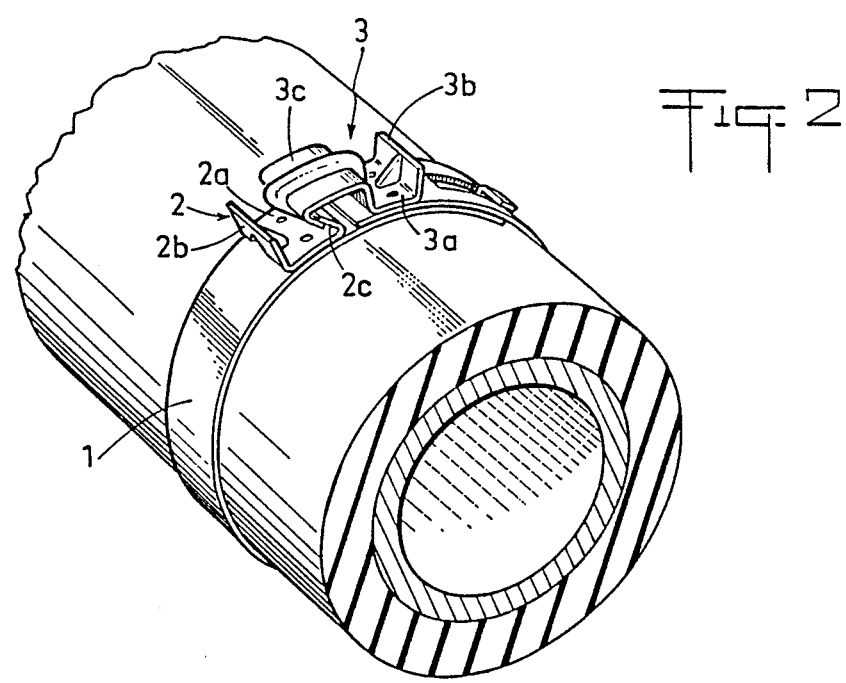
FIG. 2 is a view in perspective of a clamp according to FIG. 1, mounted and tightened on a flexible hose fitted on a rigid pipe.

Referring now to the drawings, and firstly to FIGS. 1 and 2, the clamp is essentially constituted by a metal band 1 wound on itself. The inner end 1a of the clamp extends somewhat beneath the outer end 1b for reasons already set forth in Patent EU-A-0 003 192, whilst the two ends will advantageously present at least certain of the arrangements proposed by Applicant's Patent Nos. FR-A- 2 594 901 and FR-A-2 596 468.

Two assemblies 2 and 3 of complementary tightening and joining means are fixed in the vicinity of ends 1a and 1b.

As shown in FIGS. 1 and 2, the assemblies 2 and 3 are constituted by band portions 2a, 3a, parallel to band 1, of which the two ends most remote from each other are bent in order each to form a radial fold 2b, 3b directed towards the outside of the clamp. The two radial folds 2b, 3b constitute on each of the ends of the band 1 stops capable of being gripped by the tightening tool, such as ordinary flat pliers.

The ends closest to each other of the band portions 2a, 3a are themselves bent to form hooks 2c, 3c directed, one outwardly of the clamp, the other inwardly, so as to be able to cooperate with each other, as will be indicated hereinafter.

However, it must be emphasized that the heights of the radial folds 2b, 3b are preferably equal to each other and close to the maximum distance between the other periphery of the clamp and the folds constituting the hooks 2c, 3c. In the case shown in the drawing, this maximum distance is defined by the hook 3c which projects most with respect to the clamp.

Each assembly 2, 3 is made from a metal band which will generally present the same quality, as well as the same width and thickness, as band 1. However, it may be advantageous to choose a metal band different, particularly concerning its thickness, from that of the clamp itself.

The assemblies 2, 3 may be fixed on the ends 1a, 1b of the band 1 by any appropriate means. In particular, the central portion 2a, 3a may be spot welded on band 1.

It is also advantageous to provide, during assembly of the different parts of the clamp, the formation in the band 1 of substantially cylindrical parts in relief directed outwardly of the clamp. Holes 5 will be provided in register in the central portions 2a and 3a and, after having engaged them on the parts in relief of the band, the free ends of these latter will be caulked in order thus to constitute rivets 4 for securing each assembly 2, 3 on the corresponding ends of the band 1 (FIG. 3).

Referring now to FIG. 4, it shows a variant embodiment of the clamp which has just been described; the common elements already described bear the same references as those of FIGS. 1 and 2 and will not be repeated here.

For reasons which will be apparent hereinafter, it will, however, be noted that each radial fold 2b, 3b is constituted by two elements 2b1, 2b2 - 3b1, 3b2 back to back.

Elements 2b2 and 3b2 most remote from corresponding hook 2c, 3c are advantageously provided with a bend 2d, 3d directed parallel to the periphery of the clamp, virtually in line with the corresponding central portion 2a, 3a.

In this variant embodiment, the means for fixing the assemblies 2, 3 on the band 1 will be disposed on bends 2d, 3d preferably completely but at least partly, whether it be question of welding spots or rivets such as those shown in FIG. 3.

Finally, it should be emphasized that the two assemblies 2, 3 of complementary tightening and joining means, described in either variant embodiment, may be assembled equally well at one or the other of the inner (1a) or outer (1b) ends of the band 1. Similarly, it will be noted that, to simplify manufacture, the assembly 3 may be constituted as shown in FIG. 5.

In this variant embodiment, it may be said that the central portion 3a and the bend 3d constitute the same element, whilst the radial fold 3b is reduced to the sole element 3b2 of FIG. 4, which then bears hook 3c directly.

The operation and advantages of the clamp described hereinabove, in one or the other of its variants, have already appeared to the man skilled in the art. The stops 2b, 3b present sufficient radial surfaces to be easily gripped by the jaws of ordinary flat pliers. Bringing these stops 2b, 3b together allows tightening of the clamp up to engagement of the two hooks 2c, 3c, which then maintain the clamp in its tightened position visible in FIG. 2.

In this tightened position, the radial folds 2b, 3b constitute to some extent deflectors preventing any object from gripping in the joining means 2c, 3c. Obviously, they also make it possible, again with the aid of simple flat pliers, to dismantle the clamp by releasing the hooks 2c, 3c from each other.

Furthermore, a particular advantage of the variant shown in FIG. 4 will be emphasized. The fixing of assemblies 2, 3 on the band 1, essentially by means provided on bends 2d, 3d, results in these means (weld or rivet) being stressed under shear during tightening of the clamp. The risks of destruction of these fixing means during tightening of the clamp are thus reduced with respect to the embodiment of FIG. 1. In fact, in this latter case, it is difficult to avoid a slight "rolling" deformation of the central portion 2a, 3a and the risks of tearing the fixing means. The same advantage is obviously obtained by the variant of assembly 3 according to FIG. 5.

Finally, it will be noted that the manufacture of a clamp according to the invention is rendered easier and more rational and enables clamps of various dimensions to be produced by means of common pieces. In fact, rolling of the band 1 and manufacture of the assemblies 2 and 3 are effected on specific machines and with specific tools and, on the other hand, the same assemblies 2 and 3 may be used whatever the diameter of the clamp.

What is claimed is:

1. In a clamp, adapted to be dismounted and reused, constituted by a metal band wound on itself, comprising respectively in the vicinity of each of its ends, on the one hand, two radial stops directed outwardly of the band to constitute complementary tightening means adapted to be gripped by a tool of the pliers type, and on the other hand, complementary joining means generally in the form of hooks which, in the non-tightened state of the clamp, are at a distance from each other, each assembly of a tightening means and of a joining means is constituted by respective, separate portions of metal band, in which the two ends of each portion of metal band are suitably bent to form one hook at a first section and one U-shaped, substantially back to back stop at a second section, each of said band portions being independent of the band constituting the clamp and being fixed thereon by affixing means, with the stops extending outwardly of the clamp to a height substantially the same as the hooks to prevent unintentional releasing of the clamp.

2. The clamp of claim 1, wherein the stop of each assembly of tightening means and joining means lies beyond the hook which is associated therewith with respect to the corresponding end of the band.

3. The clamp of claim 2, wherein the radial fold forming the stop of an assembly is constituted by two band elements back to back, the element most remote from the hook associated with said stop itself being provided with a bend directed parallel to the periphery of the clamp.

4. The clamp of either one of claims 2 or 3, wherein the affixing means for fixing on the band of the clamp an assembly of a tightening means and of a joining means are located between the hook and the radial fold of said assembly.

5. The clamp of claim 3, wherein the affixing means for fixing on the band of the clamp an assembly of a tightening means and of a joining means, are located, at least in part, but preferably completely, on the bend remote from the hook extending to one of the two elements forming the U-shaped stop.

6. The clamp of claim 4, wherein the affixing means for fixing on the band of the clamp of the band portion constituting an assembly of a tightening means and of a joining means, is obtained by means of spot welding.

7. The clamp of claim 4, wherein the affixing means for fixing on the band of the clamp of the portion of band constituting an assembly of a tightening means and of a joining means, is obtained by formation of a rivet.

8. The clamp of claim 7, wherein the rivet is constituted by a part in relief made on the band constituting the clamp passing through a hole made in a suitable zone of the added portion of band and caulked thereon.

* * * * *